US006178439B1

(12) United States Patent
Feit

(10) Patent No.: US 6,178,439 B1
(45) Date of Patent: *Jan. 23, 2001

(54) HTTP SESSION CONTROL

(75) Inventor: Fil Feit, Annandale, VA (US)

(73) Assignee: British Telecommunications Public Limited Company, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/996,884

(22) Filed: Dec. 23, 1997

(51) Int. Cl.[7] .............................. G06F 17/30; G06F 13/14

(52) U.S. Cl. ........................ 709/200; 709/204; 709/210; 709/219; 709/224; 709/227; 709/203

(58) Field of Search ..................................... 709/203, 204, 709/210, 219, 224, 227, 218, 223; 705/26

(56) References Cited

U.S. PATENT DOCUMENTS

| 5,218,695 | 6/1993 | Noveck et al. ....................... 707/205 |
| 5,572,643 | * 11/1996 | Judson . |
| 5,715,453 | * 2/1998 | Stewart ................................ 709/218 |
| 5,796,952 | * 8/1998 | Davis et al. .......................... 709/203 |
| 5,832,520 | * 11/1998 | Miller .................................... 709/203 |
| 5,862,325 | * 1/1999 | Reed et al. . |
| 5,897,622 | * 4/1999 | Blinn et al. ............................. 705/26 |
| 5,901,287 | * 5/1999 | Bull et al. . |
| 5,905,492 | * 5/1999 | Straub et al. . |
| 5,951,642 | * 9/1999 | Onoe et al. ........................... 709/224 |
| 6,016,509 | * 1/2000 | Dedrick ................................ 709/224 |

FOREIGN PATENT DOCUMENTS

| WO 96/29663 | 9/1996 | (WO) . |
| WO 98/26543 | 6/1998 | (WO) . |

OTHER PUBLICATIONS

Shahabi et al., "Knowledge discovery from users Web–page naviagation", Research Issues in Data Engineering, pp. 20–29, Apr. 1997.*

Crespo et al., "Responsive Interaction For A Large Web Application: The Meteor Shower Architecture in the Web-Writer II Editor," Computer Networks and ISDN Systems, vol. 29, No. 8–13, Sep. 1997, pp. 1507–1517; XP004095345.

Netscape Communications: "Javascript Reference," Javascript Reference, Dec. 15, 1997, pp. 1 & 3, XP002086907.

Netscape Communications: "Javascript Reference," Settimeout, Dec. 15, 1997, p. 45, XP002086908.

Netscape Communications: "Javascript Reference," Location, Dec. 15, 1997, p. 1 & 2, XP002086909.

* cited by examiner

Primary Examiner—Mark H. Rinehart
Assistant Examiner—Almari Romero
(74) Attorney, Agent, or Firm—Nixon & Vanderhye P.C.

(57) ABSTRACT

A means of providing session control over the Internet is disclosed. Traditionally, the Internet protocols define a session between a client and a server as one page request and one page response. This does not permit the servers to ascertain how long a client is accessing a page or whether a page containing database information is being viewed by two clients simultaneously. In accordance with the present invention, a Web page contains a script that causes the page to send beat signals from the client to the server at particular times to indicate to the server that the client is continuing to view the page. When the client releases the page, the beat will stop and the server will know that the client has released the page.

39 Claims, 8 Drawing Sheets

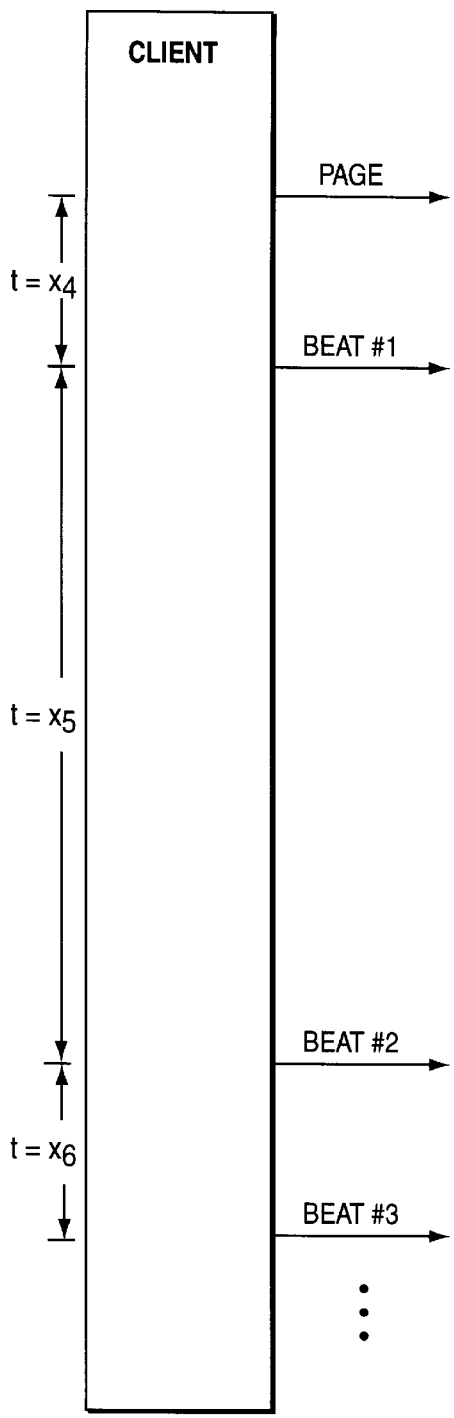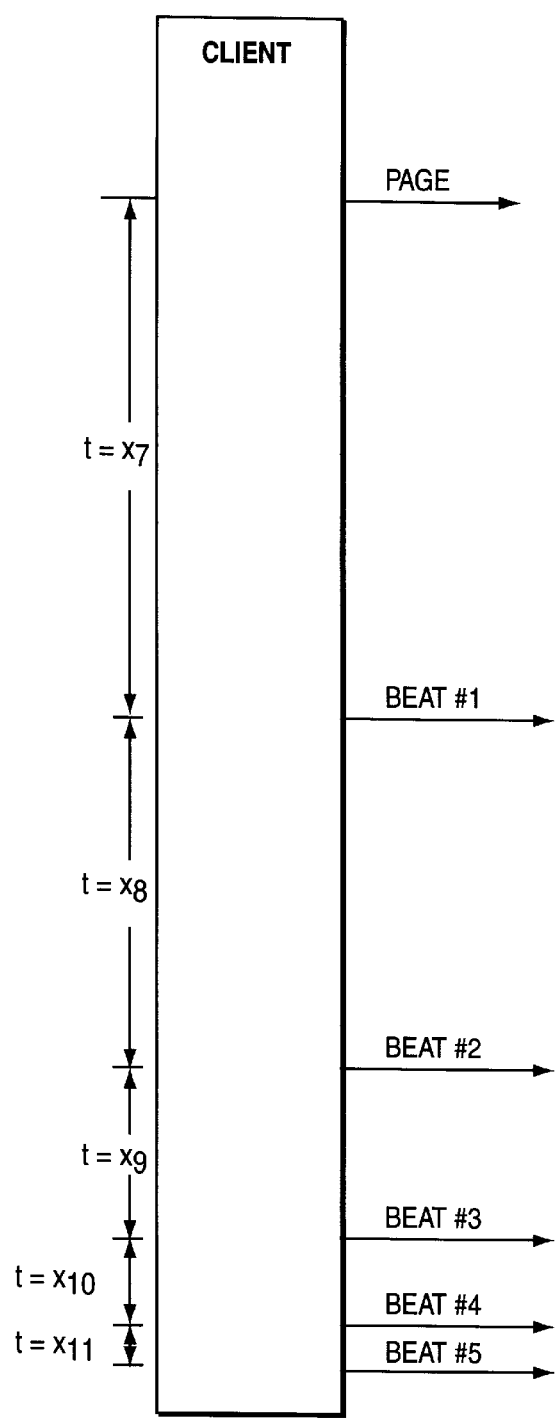
FIG. 3  FIG. 4

ACCESS LOG *14*

⋮ pc59 - - [09/Oct/1996:16:51:56 -0400] "GET /index.html HTTP/1.0" 200 12345
pc59 - - [09/Oct/1996:16:56:56 -0400] "POST /cgi-bin/nph-beat HTTP/1.0" 204 -
pc59 - - [09/Oct/1996:16:57:56 -0400] "POST /cgi-bin/nph-beat HTTP/1.0" 204 -
pc59 - - [09/Oct/1996:16:58:56 -0400] "POST /cgi-bin/nph-beat HTTP/1.0" 204 -
pc59 - - [09/Oct/1996:16:59:56 -0400] "POST /cgi-bin/nph-beat HTTP/1.0" 204 -
pc59 - - [09/Oct/1996:17:00:56 -0400] "POST /cgi-bin/nph-beat HTTP/1.0" 204 -

HTTP SESSION CONTROL

FIELD OF THE INVENTION

This invention relates to network communications such as occur over the Internet, and more particularly relates to session control for HTTP communications over the Internet.

BACKGROUND OF THE INVENTION

The Internet is a distributed network comprising a collection of servers to which remote clients communicate. The World Wide Web is a name for the collection of servers available on the Internet. The Web thus forms a communication pathway between a client and any of the servers available on the Internet.

Clients on the World Wide Web are usually Web browsers. These are programs that make requests to servers on the Internet and then process and display pages returned by the server. The World Wide Web server, in turn, is a program that handles requests from the browsers and serves up documents to the requesting browsers. These documents are usually in the hypertext markup language (HTML) which is a language universally recognized on the World Wide Web by the browsers and servers. In order to read the Web pages being returned by a server, a browser may execute a scripting language to display the returned page.

Popular scripting languages are the so-called javascript and the visual basic script. The hypertext markup language (HTML) is a command format used to inform the browser how to display a returned page. It may also specify behind the scenes information, such as alternate graphics or scripting languages. In communicating the Web pages between the server and the browser, the communication protocol employed is the so-called hypertext transfer protocol (HTTP). This is the communication protocol used by the World Wide Web to coordinate communication between a Web server and a Web browser.

Ordinarily, a Web browser will request and receive "static" World Wide Web pages from Web servers. Static pages are characterized in that the page data is pre-written and fixed. Occasionally, however, a Web server will run programs to deliver dynamic content to a browser. For example, when a server communicates with a database of information, which database can be accessed and altered by a user through a browser, the server can deliver Web pages containing the database information in an as-current condition. That is, when a user contacts the Web server through a browser to access and alter a database entry, another browser later accessing that server will retrieve the modified database information. A mechanism that allows a Web server to run a program in order to deliver dynamic content is called a common gateway interface.

Currently, every server on the Web includes an access log. This log is a file that contains details of every access made to the Web server by browsers on the Internet. Details included on this log include the date of access, the time of access, the requestor's computer identification (address), the information requested, how much information was sent to the user, and possibly the status of the transfer. Further, every browser (client) on the Web includes a cache memory which retains a certain number of retrieved Web pages so these pages do not have to be re-loaded from a server over the Internet in order to be quickly retrieved by the user.

The amount of time that two computers (for example, a server and a browser) are connected together is referred to as a "session." In general terms, a session usually last from the time a client begins communicating with the server until the time it exits the communication. On the web, however, a session is defined slightly different. In some non-Internet client/server data transfers, the client and server establish a connection between themselves during which the client may request information from the server and the server provides the information to the client. In such cases, a "session" between the client and server occurs from the time connection is implemented between the client and server until the client or server exits the session. During the session, any number of data transfers and data requests can occur between the client and the server. On the Web, however, the limitations of the hypertext transfer protocol and the World Wide Web structure cause clients and servers on the Web to adhere to a non-standard concept of a "session." On the Web, a session will consist only of the time that a page (whether a data file, image file, etc.) is requested and downloaded to a user (browser). Each session between a Web client and a Web server thus amounts to one request from the client to the server for a page and one page transfer from the server to the client. Session information recorded in the log of the server will thus identify the date of the page request, the time of the page request, the computer making the page request, file information identifying the page requested, the number of bytes sent to the requesting computer to deliver the page, and possibly the status of the transfer.

The Internet is thus not like the classic case of one client computer connecting to another server computer to access, for example, a database. In the classic case, the client user will examine a database record while remaining connected to the server. In such a case, the server can record the duration of the database access by the client. These records can be used for statistical analysis regarding how much time users spend viewing the records since the sessions are defined by the time duration from connection to exit to and from the database. It may also "lock" the database record, preventing others from accessing it until this client is done.

The same is not true for the Internet connections since a session is not defined by the total connection time between a client and a server, but rather by a single page request and a single page delivery. In the Internet case, there is no way for the server to know when the user has finished using a particular record nor of how long the user viewed a particular record. Prior methods tried to address this by using manual mechanisms to inform the server when a user was finished with a record, but such systems were client-dependent and could not be implemented on the server alone. Thus, when it was important for a server to know exactly when a user was finished with a record or to know exactly how long a user viewed a record, the present Web structure did not provide an effective solution.

An example of how this problem surfaces in the Internet environment occurs when two users attempt to access information in a database via the Web. Suppose for example that user A requests information from a product inventory for a particular product X located at a warehouse. The warehouse employs a server on the Web to deliver information to users regarding the amount of inventory of the various products. Suppose also that 200 units of product X are presently available in the warehouse when user A requests the inventory information. The warehouse server upon the request from user A for a page identifying the inventory of product X will look to its database, pull off the inventory quantity "200" and deliver the page identifying this quantity to the user A. Assume then that another user, user B, requests the same inventory information for product X. The warehouse server would receive the page request from user B, look to its database, see a product X quantity of 200, and deliver a page identifying product X inventory as "200" available units. A problem then occurs when user A tells the warehouse server in another page request that it is ordering 150 units from the 200 available. The warehouse server would write the 150 unit reduction into its database in response to the order from user A. Then, user B attempts to request 100 units from warehouse server by sending a order request to the warehouse server. The warehouse server has created a problem by accepting orders for 250 units when it has only 200 available.

In the above example, it is important that the warehouse server not deliver the page to user B in response to user B's page request until the server knows that user A is finished with the same page. If user A does not, through some mechanism, manually indicate to the warehouse server that it has completed its use of the product X inventory page, the warehouse server cannot know whether delivering the same product inventory page to user B is timely and accurate.

Another example in which the limited session definition on the Web yields problems is where session control is required for statistical purposes. This occurs, for example, when companies advertising on the Web would like to know how long someone has been viewing their page, or a page bearing their advertisement. With the present Web session definition, in which a session is simply one page request and one page delivery, the server cannot know how long a user views a page or advertisement, without some manual mechanism. Thus, without some way of identifying a termination of a client's use of a particular page, the server does not know how long a user has viewed a page.

FIG. 1 identifies the present state of Internet sessions. In FIG. 1, the system 1 includes some number of clients, from client no. 1 through client no. n. The clients have access to a number of servers, including server 12 through the Internet connections 10. As shown in FIG. 1, the server 12 receives requests from the clients during sessions indicated by "A" and "B".

During session A, client no. 1 informs server 12 through the Internet 10 that it would like to receive a particularly identified page ("give me a page"). The server 12 responds to this request by assembling the page and transmitting it to the client no. 1 via the Internet 10 ("here's your page"). This pair of communications ("give me a page" and "here is your page") is the total communication between client no. 1 and server 12 for the full session "A". Similarly, client no. n may also request pages from server 12, as shown as session "B." In session B, client n also requests a page from server 12 and receives the page from server 12.

As discussed above, the problems exist when client no. 1 and client no. n generally simultaneously request a same page during session A and session B from server 12 and thus may modify the records in server 12 in an overlapping manner. Thus, in such a case, the server 12 may be modifying a database 16 erroneously in response to overlapping requests from clients. Further, problems also arise in that the server 12 cannot identify how long a session A or session B lasts, even though it records the session times in its access log 14, since the session begins and ends with, respectively, a page request and a page delivery alone.

SUMMARY OF THE INVENTION

The present definition provides session control on the Internet such that a server can identify when and for how long a client accesses a page delivered by the server. The present invention does this by attaching to each page delivered to a client information identifying a "heartbeat" program which causes the page to return a beat to the server at defined intervals while the delivered page is being viewed. In the simplest example, a server would return a page to a client which sends a beat back to the server every minute until the client finishes viewing the page.

By recording these beats returned by the page, the server can then identify approximately how long a client viewed a particular page by looking at the number of beats returned by the page during the viewing. For example, if five beats were returned, in the above example, the server could conclude that the client viewed the page for more than five minutes, but less than six minutes. Further, the client would know at the end of six minutes that the page had been freed up and could then be accessed by a new client without overlapping the original one.

Although the present invention does not provide pure session control over the Internet, it does provide good information to the servers to identify when and for how long a page is accessed for purposes of avoiding overlap and generating statistical information. Further, the present invention can be employed by balancing the frequency of the beats versus tolerance of the statistical sampling. That is, beats which occur every minute are more burdensome on the Internet capacity and the client processor usage, but provide more accurate results than, for example, beats which occur every five minutes.

BRIEF DESCRIPTION OF THE DRAWINGS

FIGS. 2 through 4 are schematic time diagrams identifying the communications that occur between a client and a server in accordance with several example embodiments of the present invention;

FIG. 6 is an example entry in the access log of the server 12 of FIG. 5 in accordance with an example embodiment to the present invention;

DETAILED DESCRIPTION OF THE PRESENTLY PREFERRED EMBODIMENTS

Figure 1:
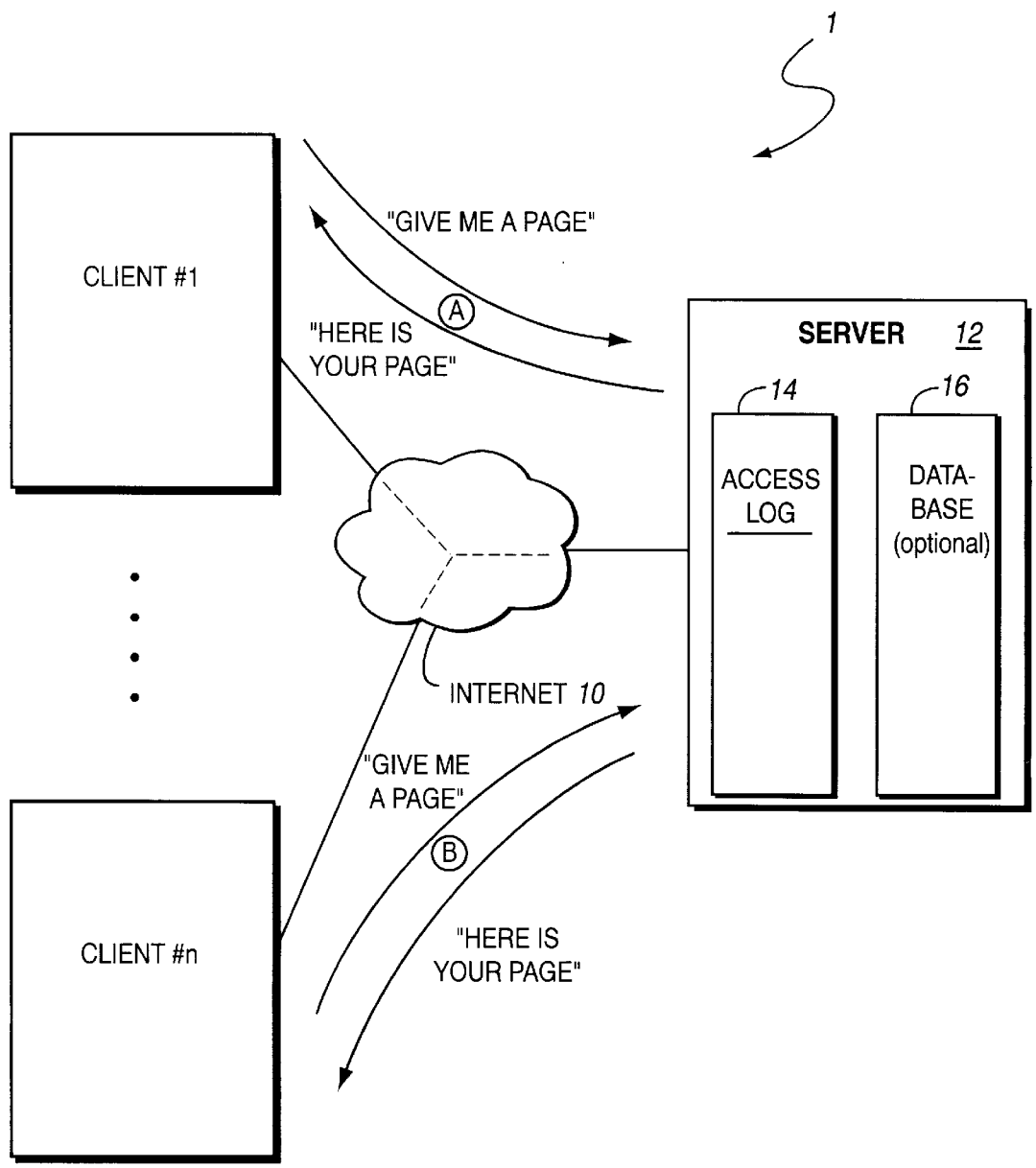
FIG. 1 is a simplified schematic diagram of Internet sessions between clients and servers on the Internet in accordance with the prior art.

Whenever a client, such as the client no. 1 in FIG. 1, sends a request for a page to server 12, server 12 produces a log entry for the request in the access log 14. A typical log entry is shown below:

elara.planet.bt.co.uk—[12/may/1994:10:10:11-400] "GET/icons/blank.xbm HTTP/1.0" 200 509

In the above log entry, "elara.planet.bt.co.uk" is the address of the client computer. The date and time of the request is shown in the brackets, terminated by the request type (in the example "400"). Following the bracketed information is a command to retrieve an indicated file ("icons/blank.xbm"). Following that is the protocol (HTTP/1.0), followed by the return code (200) and the number of bytes of the file requested (509).

In the above example, the entry inserted into server 12 access log 14 is a request by the client "elara.planet.bt.co.uk" on May 12, 1994 at 10:10:11 to retrieve the file called "icons/blank.xbm" from server 12 in the HTTP format. A similar entry will be made in the access log 14 of the server 12 each time a client requests a page in a session (A or B of FIG. 1) with the server 12. A development of the access log 14 in the manner described above is known in the prior art and will be an accurate record of the number and times of the various sessions in which clients request pages from server 12. It does not, however, record the duration in which a client accesses a particular page.

In the past, some programs that perform Web reporting make statistical guesses as to how long a client remains on a particular page by viewing the hit history of particular clients on the pages provided by the server. There is, however, no way to know from the prior art access log method whether the statistical guesses are valid indicators of the duration that clients spend on particular pages.

The present invention bypasses the lack of session information on the Web by generating a series of potential end-of-session requests. In its simplest embodiment, the present invention requires only a small scripting language function to be placed in each page reported by server 12, together with a simple CGI script to be placed on the server 12. The scripting language function placed on each page provided by server 12 will cause the page to produce a beat message to the server 12 at defined intervals. The simple CGI script placed on the server 12 then receives these beats, records them, and replies to them in the manners described in more detail below. In laymen's terms, the beat provided by the page essentially tells the server that the client is continuing to utilize the page and the reply from the server is a reply that there has been "no change to the current page." In this manner, the present session control system is essentially invisible to the user.

Figure 2:
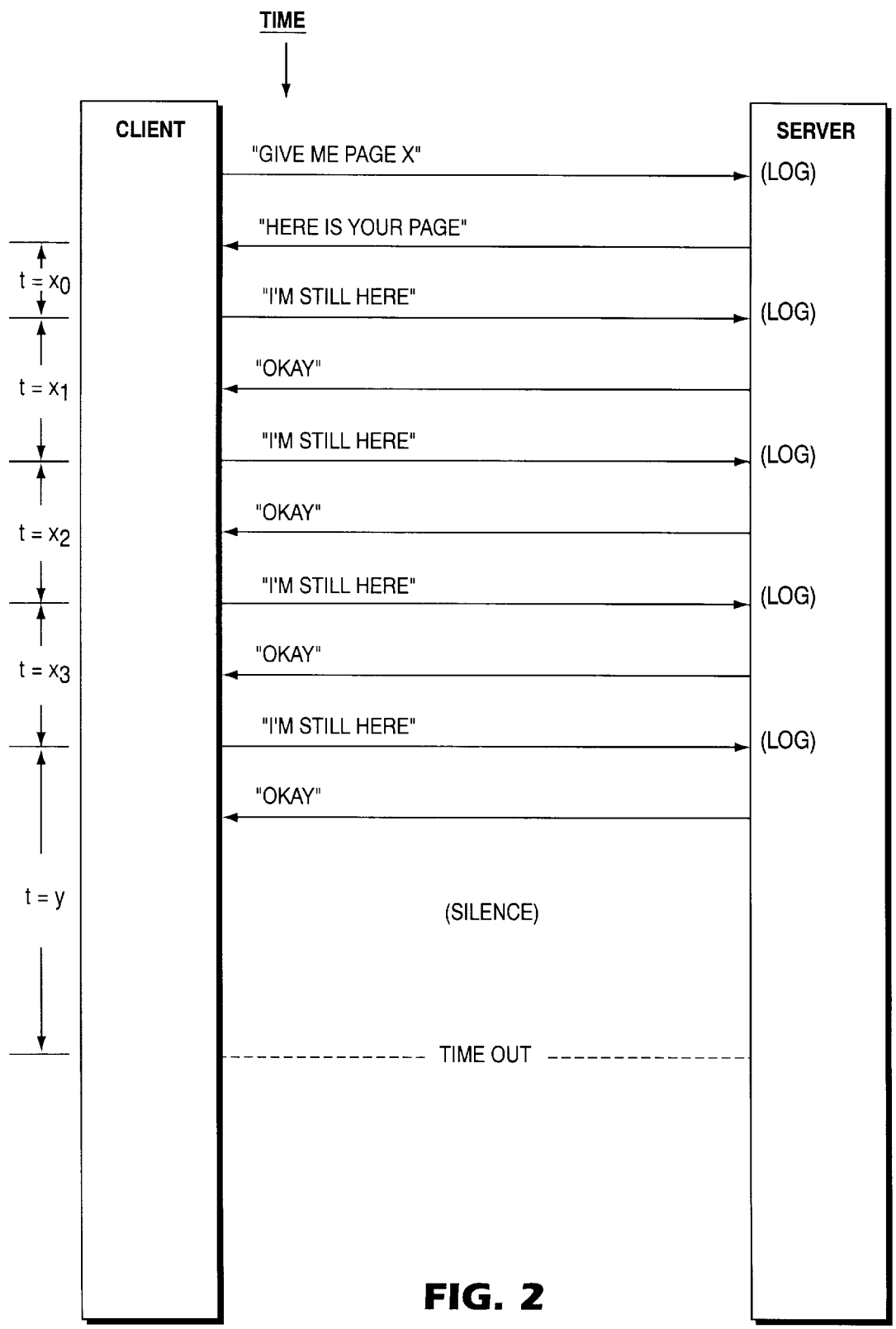

FIG. 2 illustrates an example embodiment of the present invention in which a client and a server exchange the session control information of the present invention. Note that in FIG. 2, the communications from the client to the server are shown by right arrows, and the communications from the server to the client are shown by left arrows. Further, in FIG. 2, the communications are arranged chronologically from the top of FIG. 2 to the bottom of FIG. 2. Note that FIGS. 3, 4, 5, 6, 8, and 9 are similarly situated with chronological sequences running from the top of the respective Figures to the bottom.

In FIG. 2, the first two communications between the client and server are identical to the prior art situation described with respect to FIG. 1. That is, the client begins a session (like session A in FIG. 1) with a request to "give me page X" to the server. The server then logs the request in accordance with the example log entry described above, into the log 14. The server then responds to the client with the page requested in the response, "here is your page." This page is different from the prior art pages to the extent that the page includes the scripting language function that will produce the later beats. An example scripting language function is described in detail later.

Once the client receives the page, the scripting function will wait a predetermined time $X_0$ and then will generate a request to the server, essentially telling the server "I'm still here," meaning that the client is still using page X a time $X_0$ after the page was received by the client. This first response to the server following the receipt of the page is referred to as the first beat. In response to the first beat, the server logs the beat into the access log and then responds by essentially sending the client a null page, which can be interpreted as meaning "Okay—I understand you are still on page X."

Following the first time interval $X_0$, at which the first beat is sent to the server, the page waits another time interval ($X_1$) and sends the second beat to the server. The server logs this beat and replies. The process then continues during the interval $X_2$ and $X_3$. Finally, after the beat following the period $X_3$ is sent, the server becomes aware that the client has left page X because the beats from the client have ceased.

In any event, the server in the example embodiment of FIG. 2 has logged into its access log 14 sufficient information to indicate that the client requested page X and remained on the page at least as long as $(X_0+X_1+X_2+X_3)$. Further, because in the embodiment of FIG. 2, the beat durations ($X_1$, $X_2$, and $X_3$) are of uniform length (which is not a requisite of the invention, as described in later embodiments), the server log contains information sufficient to know that the client remained on page X for a duration greater than $(X_0+3X_1)$ but less than $(X_0+4X_1)$.

FIGS. 3 and 4 show further example embodiments of the present invention that may be useful for accumulating different kinds of data. FIGS. 3 and 4 are shorthand diagrams of the type shown in FIG. 2, with the server and server responses omitted for brevity. The differences between the embodiments of FIGS. 2, 3, and 4 is in the organization and duration of the beats provided by the page to the server. In FIG. 2, the beats ($X_1$, $X_2$, $X_3$) are arranged at uniform intervals. In FIG. 3, the first beat occurs at an interval $X_4$ and thereafter beat number 2 does not occur for approximately four times the duration of $X_4$. Then, beat numbers 3, 4, etc. occur at the same duration as the first beat. That is, in FIG. 3, $4X_4=X_5=4X_6$, etc. The embodiment of FIG. 3 may be relevant for the determination of statistics where an advertiser wants to know if the user remained on a page long enough to absorb an advertisement ($X_4$) but then doesn't really care how long the user remained, unless it is extremely long ($T=X_5$), at which time the advertiser may be curious to learn exactly how long the user remained on the page, which would be shown by increased frequency beats ($T=X_6$).

Still another example embodiment of the present invention is shown in FIG. 4 in which the beat frequency increases over time. The FIG. 4 example may be relevant, for example, in the case where two users may be accessing the same database and the server wishes to poll a first user to determine when the user is finished with the database in order to allow the a second user to then access it. In this case, the server would expect to give the user a certain (more lengthy) amount of time ($T=X_7$) before requesting the first beat. Thereafter, the server would request beats more frequently to determine when the user left the system. This FIG. 4 embodiment is thus appropriate when one knows that a user should be expected to spend a fair amount of time within a page before exiting it. For example, in the embodiment described in the background section above, where two users were accessing the same products X inventory database on the warehouse server, if the warehouse knows that users spend approximately 3 or 4 minutes within the database accessing inventory records and making purchases, the warehouse server can set the $X_7$ beat at approximately 3 minutes, the $X_8$ beat at 1½ minutes, the $X_9$ beat at 40 seconds, etc., to narrow down precisely when the user within the approximately 3 to 4 minute range actually leaves the database.

Figure 5:
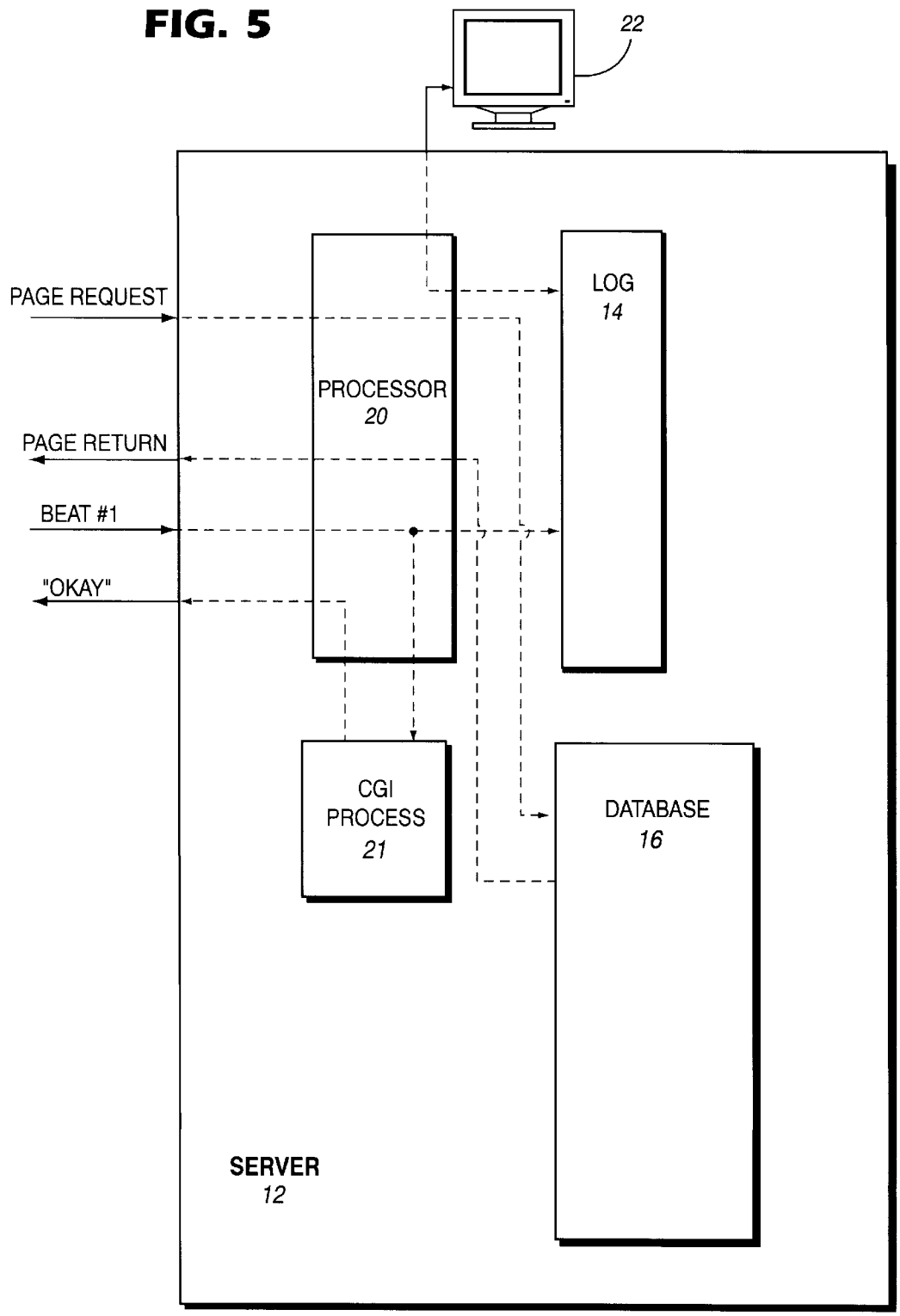
FIG. 5 is a schematic block diagram of an example embodiment of the server 12 communicating in accordance with an example embodiment of the present invention.

FIG. 5 illustrates an example embodiment of the server 12 structure. Again, the page requests and beat signals are shown on the left side of FIG. 5 in chronological order from top to bottom. When the page request is received from a client, the server 12 accepts the page request in processor 20 which then accesses database 16 to find or compile the page. After doing so, the processor 20 sends the page to the client in the "page return" transmission. As described previously, this page includes the scripting language function which will produce the beat signals at predetermined intervals. As shown in FIG. 5, the first beat, "beat no. 1," is returned after a first interval. This beat is received by processor 20, which records the beat signal in log 14. Next, processor 20 accesses CGI process 21 (which is referenced in the beat no. 1 signal as described subsequently), which informs the processor 20 to send the "Okay" signal back to the server.

Later, a user of the server 12 can access the processor 20 via remote computer 22 in order to access the log 14 to remove the page requests and subsequent beat information. From these, the computer 22 can compile duration information for statistical purposes.

When the server user accesses the log 14 via the computer 22, it will, according to an example embodiment of the invention, see an access log 14 similar to that shown in FIG. 6. The example of FIG. 6 is similar to the communications sequence shown in FIG. 2 in that the beat frequency ($X_1$, $X_2$, $X_3$, etc.) is of uniform duration. As will be described in more detail below, the information identified in the access log 14 of FIG. 6 tells the user of the server that a particular client accessed a particular page then viewed it for more than 9 minutes but less than 10 minutes.

This can be ascertained from viewing each of the lines shown in the access log 14 of FIG. 6. In the first line, the processor 20 recorded in the access log a page request from a client identified as "pc59" for a page entitled "Index.html." This page request occurred on Oct. 9, 1996 at 16:51:56. The first line of the access log 14 in FIG. 6 is a page request as identified in the command "GET."

After the "GET" request line, the next five lines in FIG. 6 are, respectively, five beats returned by the page to the server. As can be seen from these lines, the beat is returned from the same PC, "pc59," on the same day (Oct. 9, 1996). The heartbeats begin five minutes after the page request (referring to FIG. 2, $X_0$ equals 5 minutes), and thereafter produces beats every minute (referring to FIG. 2, $X_1 = X_2 = X_3 = 1$ minute). Thus, the script has, for this page (Index.html) been told to wait five minutes before sending the first beat. Thereafter, the script is to send one beat per minute back to the server. From the information shown in FIG. 6, we can determine that the pc59 user received the index.html page at 16:51:56 and stayed there until at least 17:00:56, but not until 17:01:56. We know this since the beats, which are scheduled to occur every minute following the first one end at 17:00:56.

Of course, the access log example in FIG. 6 is merely exemplary of one type of beat sequence that can be employed. If one wants to know if a client user has remained on a page with a finer granularity then that provided by the beat shown in FIG. 6, the script can be easily modified to produce beats, for example, every ten seconds instead of every minute. Also, the initial beat (which occurs five minutes after the page request in the example of FIG. 6) can be changed as well (for example to 1 minute). The present invention is not limited in any way to the beat interval organization or times.

Other types of beat scripts can also be produced and are envisioned within the present invention. For example, the script can provide a beat based on clock time (for example, every hour on the hour), or based on special algorithms (for example, $X_n = 2X_n + 1$, as shown in FIG. 4). Still another type of fancier script could produce a single beat at a specified time (for example, 2:00 pm) to determine whether a user who is supposed to be present on the page at 2:00 pm is in fact there at the specified time. Many other types of beat scripts can be envisioned and the present invention is not limited to any particular type of beat sequence.

Figure 7:
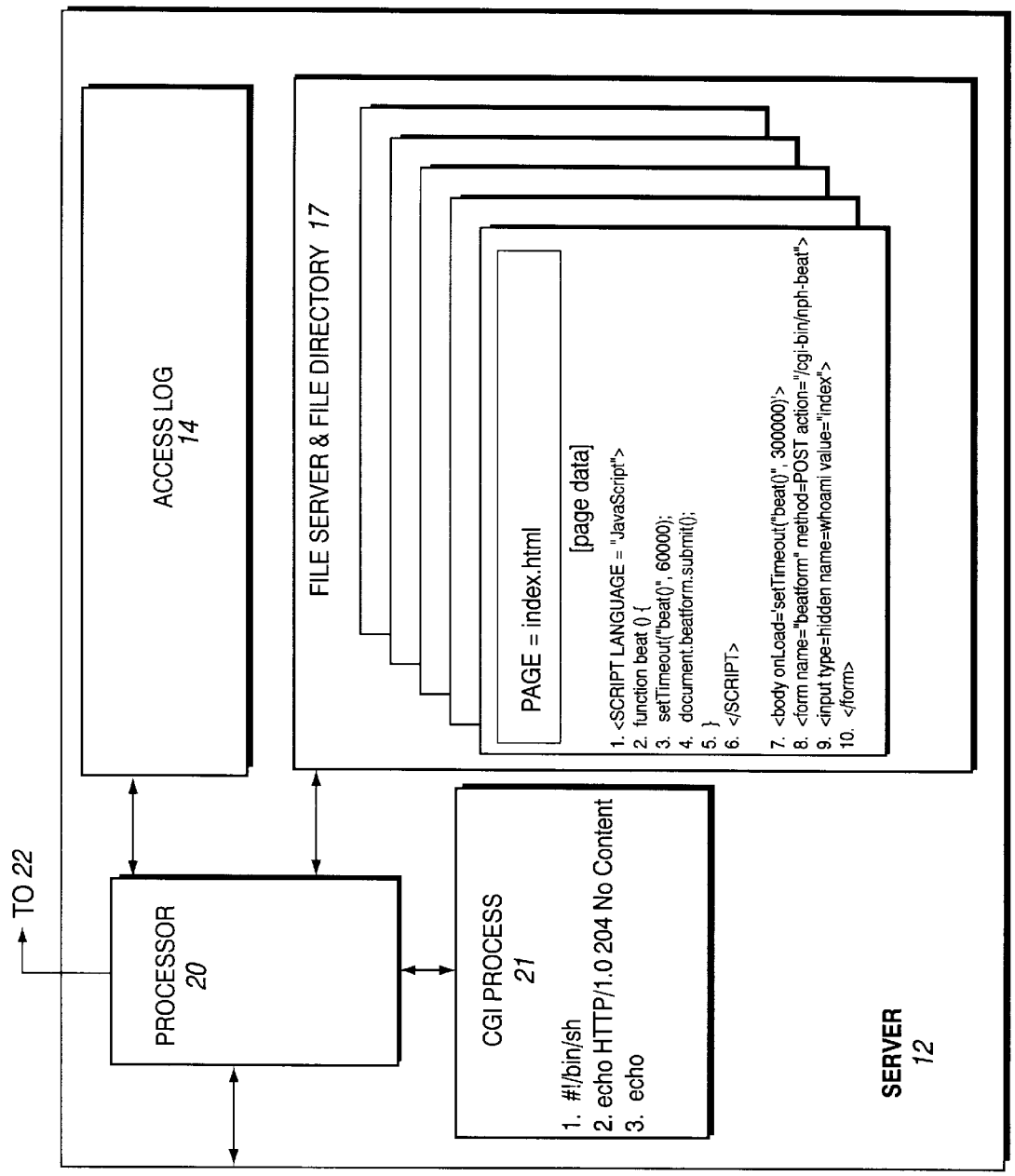
FIG. 7 is a schematic diagram of the example server 12 of FIG. 5 according to yet another example embodiment of the present invention.

FIG. 7 illustrates one example type of script that can be employed in accordance with the present invention. Of course, the present invention is not limited to the specific script described in FIG. 7, but extends to any other kind of script envisioned within the purposes and functions described in this specification and claims. In the example of FIG. 7, the server 12 of, for example, FIG. 5 is shown in greater detail. One difference between FIG. 5 embodiment and the FIG. 7 embodiment is the difference in the data memory. In FIG. 5, the server 12 accesses a database 16 from which data is pulled to compile a page. On the other hand, in FIG. 7, the processor 20 of the server 12 accesses pages from a file server and file directory 17. These and other embodiments are envisioned within the invention, provided server 12 can find and prepare pages for transmission to the clients.

In the example of FIG. 7, a client (not illustrated) has requested a page entitled "index.html" from the server 12. In the index.html page, in addition to the page data which will provide the page information displayed to the client user, the script function shown in lines 1–10 of the index.html page is included. As shown in FIG. 7, the example script function on the index.HTML page is as follows:

1. <SCRIPT LANGUAGE="JavaScript">
2. function beat( ) {
3. setTimeout("beat( )", 60000);
4. document.beatform.submit( );
5. }
6. </SCRIPT>
7. <body onLoad='setTimeout("beat( )", 300000)'>
8. <form name="beatform" method=POST action="/cgi-bin/nph-beat">
9. <input type=hidden name=whoami value="index">
10. </form>

The script function will provide the beat signal to the server 12 from the client, in accordance with the example embodiment of FIGS. 2–6, as described earlier. In the script, the particular lines perform the following functions:

Line 1 specifies that the script is written in the well-known java script format. Of course, other script languages are known and can be employed, an alternative example of which will be described below.

Line 2 defines a function entitled "beat."

Line 3 requests that the defined beat function be called up every 60,000 milliseconds (60 seconds).

Line 4 is an instruction to send the form entitled "beatform" to the server 12.

Line 5 ends the function definition.

Line 6 ends the javascript section.

Line 7 runs the function entitled "beat" 300,000 milliseconds (5 minutes) after the index.HTML page is retrieved. This will establish the first beat ($K_0$ in FIG. 2).

Line 8 defines a form to submit to the server. When the form is submitted, it will run a program entitled "nph-beat" on the server 12.

Line 9 specifies that the forms should have at least one field.

Line 10 specifies the end of the form definition.

Once the index.html page is received by the client, the page will, after the 5 minute duration, run the beat function, which will send the "beatform" to the server every 60 seconds. When the beatform is received by the server 12, it will read the action in the form (line 8 of the index.html script) which indicates to it that the "nph-beat" script should be run. The processor 20 calls on the CGI process 21 (which may be a separate software component or may be incorporated within the processor 20), which runs the server CGI script as shown in FIG. 7. This script is shown in UNIX format, but may in alternative formats as described later. As shown in FIG. 7, the CGI server script is very simple. Line 1 of the CGI server script indicates that the script is in a UNIX shell program. Line 2 sends an HTTP header to the browser at the client that requested the index.html page. This header specifies "no content" meaning that no action need be taken by the browser. Finally, line 3 of the CGI script sends a blank line following the header.

With the example script shown in FIG. 7, a client requests the index.html page, the page arrives with the script shown, and five minutes after receiving the page, the page runs the "beat" function. In running the "beat" function, the page sends the "beatform" document to the server 12 every one minute. This document tells the server to look for a CGI process entitled "nph-beat." When the server finds this process, the process will cause the server 12 to issue an HTTP header followed by a blank line back to the client. This blank line is essentially equivalent to the "Okay" statement shown in FIG. 2, while the "beatform" sent by the index.html page is essentially equivalent to the "I'm still here" statement shown in FIG. 2.

A C language equivalent to the CGI script shown in FIG. 7 is shown below:

1. #include<stdio.h>
2. main( ) {
3. printf("HTTP/1.0 204 No Content/n/n");
4. }

In the above code, line 1 is required by the C language;

Line 2 defines the main program;

Line 3 sends an HTTP header to the browser specifying that no action need be taken by the browser; and Line 4 terminates the program definition.

It is important to note that on many current World Wide Web servers, the name of the CGI script name must begin with "nph" in order for it to return the content header.

The above example scripts are appropriate for the example embodiment of FIG. 7, where the server 12 is retrieving a page, from, for example, a file directory 17. For the case where the server 12 is retrieving information from a database, which may be modified by a client, such as is shown in FIG. 5, the scripts are slightly more complex. As described in the background section above, the problem solved with respect to the database application is more than simply easily obtaining statistical information, but also involves ensuring that two clients are not accessing the same database entry at the same time. In the preferred embodiment of the database application, the beat will be steady (i.e., uniformly periodical). In addition, the returned field from the database within the page form should also have some sort of self-identification (i.e., each page returned should have a unique identification field), so the server 12 will know where the client user is.

In the database application, the server script in the CGI process 21 must be designed for the specific database application. In particular, the script must 1) know where the database is located, and 2) know how to handle the fields within the specific database. Further, for the database application, the Web page returned by the server must be generated by the server dynamically, meaning that the fields from the database are retrieved and the pages then created based on the returned database information. Ideally, the Web page includes the beat script function, together with a form (or document) to be returned by the beat function containing an appropriate identification field.

In the preferred embodiment, the server CGI script that creates and accepts the page should perform the following functions:

1. If a page is in use by someone, decline to deliver the page to another user;

2. Mark the beatform with a proper identification field;

3. Fill in the data form with the database information, if necessary; and

4. Decline to accept a returned form, if a beat is "broken," and someone else has referenced the page in the interim.

Figure 8:
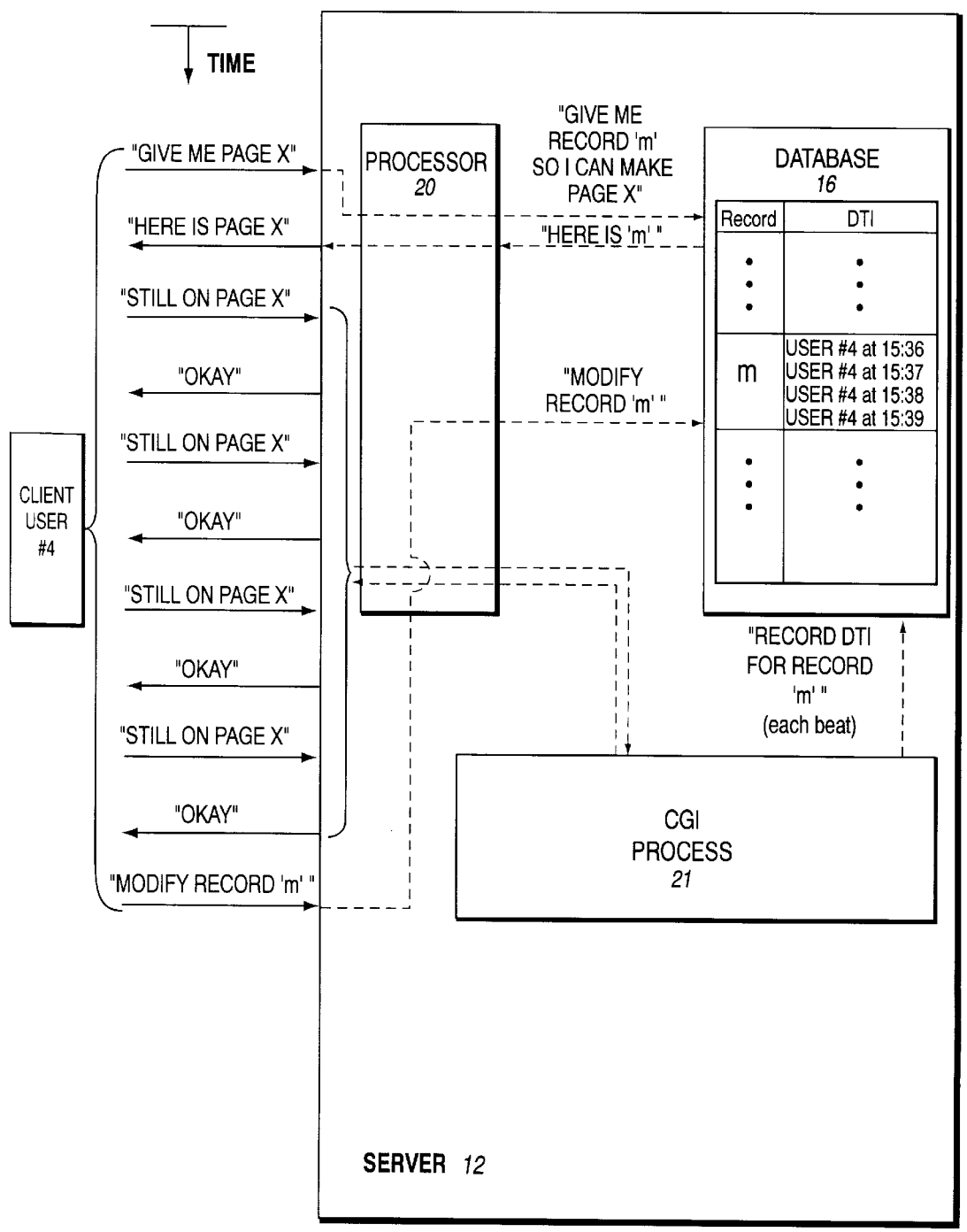
FIG. 8 is a schematic time diagram of the communications within and outside of the server 12 during an example communication session with a client.

An example of a client user no. 4 assessing database information on a server 12 is shown in FIG. 8. First, the client user makes the page request "give me page X." This request is received by the processor 20, which accesses database 16. In the example shown in FIG. 8, page X may be an inventory record which requests an inventory amount "M" for a particular product. In this case, the processor 20 asks database 16 to retrieve record M in the command "give me record 'M' so I can make page X."

Within the database 16, every record includes a date/time identification (DTI) record, which acts as a log for the particular record. The DTI information is recorded in the database as another field. Thus, when the client user no. 4 requests page X, requiring data record "M" the request for record M by user no. 4 is recorded in the DTI field for record M in the database 16. The DTI field can be similar to the entries shown in the access log 14 of FIG. 6, although a shorthand form is used for brevity in FIG. 8. In the example of FIG. 8, the initial beat and every beat thereafter occurs at one minute intervals and the original page request occurs at time 15:36. As a result, the record M has an associated DTI field with a first access record entry of "user no. 4 at 15:36" indicating that the client user no. 4 requested a page requiring record M at 15:36.

After the processor 20 requests record M in order to make page X, database 16 returns record M to processor 20, which builds the page X (a form), including a CGI script (described in more detail below) and the record "M" information. Thereafter, the page scripting function will cause the client user no. 4 to send beats to the server 12 every minute that it remains on the page. These beats are shown in chronological sequence from top to bottom of FIG. 8 as the statements "still on page X." The beats from the client user no. 4 will identify the page information to the server 12, as described in more detail below. The processor 20 receives the beats from the client user no. 4, which cause the processor 20 to call up CGI process 21. This process 21 is another scripting function which causes server 12 to respond with a blank line meaning "Okay." Further, each time the beat is received by processor 20 and CGI process 21, the database 16 is modified in the DTI field for record M by logging the beat entry. Thus, for example, record M in database 16 is shown as having a (partial) DTI field indicating that user no. 4 has remained on page X from 15:36 (and every minute thereafter) through at least 15:39 (and possibly further depending on how long client user no. 4 continues to send beats to server 12 by remaining on the page).

Finally, client user no. 4 may send a request to server 12 in effect asking the server 12 to modify record "M." This may occur, for example, if client user no. 4 makes a request to purchase a certain number of the product inventory "M" for a particular product. The client user no. 4 does this by returning a form indicating the modification to record M. This form is received by processor 20, which informs database 16 that record M is to be modified. Database 16 modifies record M accordingly. Thereafter, the client user no. 4 leaves page X, causing the beats to go silent. This informs the server 12 that record M is now available to another client user. This is shown in more detail in FIG. 9, where client no. 1 requests page 4, receives page 4, then sends 1 (or more) beats to server 12 indicating how long it remains on page 4. At some point, client no. 1 will leave page 4, and silence will ensue between client no. 1 and server 12, telling server 12 that client no. 1 has left the page. Then client no. 2 can, at request "c," request page no. 4. The response from server 12, shown in FIG. 9 as communication "D," will depend on the script function and the time $T_C$ between the final beat received by client no. 1 and the request for page 4 by client no. 2. Examples of the various possibilities for response "D" from server 12 to client no. 2 are described in more detail below.

First, an example page script is shown below for a Web page that will display data from a table "T." This page is created by a server CGI script that gets the requested record number "M," reads from table "T," and allows the user to modify that record. When the user returns the record to the script, the record is re-written to the database and the next record (M+1) is retrieved in its place. This example is simply one implementation of the present invention and is not limiting of it:

1. <html>
2. <head>
3. <META HTTP-EQUIV="Expires" CONTENT="Thu, 01 Dec 1994 16:00:00 GMT">
4. <script language="JavaScript">
5. function beat ( ) {
6. setTimeout("beat( )", 60000);
7. document.beatform.submit ( );
8. {
9. </script>
10. <title>Record m From Table T</title>
11. </head>
12. <body onLoad="beat ( )">
13. <form name="beatform" method=POST action="/cgi-bin/nph-dbbeat">
14. <input type=hidden name="whoAmI" value="T/m">
15. </form>
16. [introductory text would go here]
17. <form name="dataform" method=POST action="/cgi-bin/dbupdate">
18. <input type=hidden name="whoAmI" value="T/m">
19. [data fields, filled with information from table T record m go here]
20. </form>
21. ["footer" text would go here]
22. </body>
23. </html>

As line 4 indicates, this example script is written in javascript format, but other formats are possible. Explanations for certain relevant script lines are as follows:

Line 3 forces the page to be reloaded from the server. This responds to one possible problem where someone works on a page, and then jumps to another page, and then returns to the first page. If the first page is recent, the browser may try to extract the page from a cache memory, where recent pages are kept on the assumption that people often return to the same pages. If the page is pulled from cache, the beat function will start again even though someone else may have retrieved the page in the interim. The CGI script called "DBUPDATE" will disallow this by refusing to save the page. Instead, the message is returned to the user telling that the user no longer possesses it. As an additional precaution, each generated page is given an expiration length which causes it to expire before it can be downloaded. Expired pages are not cached. Other alternative techniques may be used to prevent the pages from being cached to address this problem.

Line 5 is the beat function that submits "beat form" every 60 seconds.

Line 10 is a title of the table information returned, for example, "information for Mike Jones from the payroll table," or such other useful information.

Line 12 starts the beat when the page is loaded.

Line 13 runs the CGI script "nph-dbbeat" whenever a beat is made. A field called "whoAmI" then is passed with the value specifying the record and table.

Line 16 is text describing what the user sees, or perhaps a company logo.

Line 17 is another form containing all of the relevant data for the record. If the record is a payroll record, it may include name, employee identification, salary, tax information, etc. When complete, the form is submitted to "DBUPDATE," which saves the information and returns a new page with the data for record M+1. With Javascript, a series of "submit" buttons may be created, which will return, for example, the first record, the final record, the previous record, the next record, or a specific record. The present example returns the "next record."

Line 18 is the "whoAmI" field included in the form.

Line 21 is closing text, perhaps linking corporate pages, help pages, etc.

Line 22 terminates the body of the page.

Line 23 terminates the page.

According to this example, two CGI scripts are needed to work with the file: One CGI script to handle the beat and one to update and deliver the Web page from the database. The beat script must place a date/time/identification (DTI) stamp onto the specified location, as shown in FIG. 8. The DTI stamp can overwrite previous DTI stamps, or can log them. If the DTI stamp is permitted to overwrite, criteria for permitting the overwrite condition could include:

1. The computer that submitted the DTI is the same one that specified it previously; or
2. The current date/time is beyond the "timeout" period of the previous DTI stamp.

An example CGI script for the beat function is shown below in pseudo code, with reference to standard C language functions where it will aid in readability:

1. Identify the computer sending the request via getenv ("REMOTE_ADDR"). Save this as "ipAddress."
2. Get the value of the "whoAmI" parameter. This can be done using standard CGI utilities. Save this as "whoAmI."
3. Open a file named by the value of "whoAmI" for reading.
4. If this file exists:
5. read the contents. Save the ip address as "lastIP," and the date/time as "lastDT."

6. if the lastIP is the same as the whoAmI, or if the (time now)—lastDT is more than the timeout period, then:
7. re-open the file for writing.
8. Insert whoAmI and the current date/time.
9. else, this person is trying to steal someone else's heartbeat. Ignore him.
10. else, the file does not exist:
11. open the file for writing.
12. Insert whoAmI and the current date/time.
13. close the file.
14. write "HTTP/1.0 204 No Content\n\n" to stdout, to inform the client that the script has been processed.
15. terminate the script.

The second script needed for the above example is the one that updates and delivers the Web page from the database. In the example, this is referred to as the "DBUPDATE" script, an example of which is shown below in pseudo code, with references to standard C language functions where that will aid readability:

1. Identify the computer sending the request via getenv ("REMOTE_ADDR"). Save this as "ipAddress."
2. Get the valueof the "whoAmI" parameter. This can be done using standard CGI utilities. Save this as "whoAmI."
3. Open a file named by the value of "whoAmI" for reading.
4. If this file exists:
    5. read the contents. Save the ip address as "lastIP," and the date/time as "lastDT."
    6. if the lastIP is the same as the whoAmI, or if the (time now)—lastDT is more than the timeout period, then:
    7. re-open the file for writing.
    8. Insert whoAmI and the current date/time.
    9. else, this person is trying to steal someone else's heartbeat. Ignore him.
10. else, the file does not exist:
    11. update the current database record.
    12. build a new page with the heading "Record <m> has been successfully updated" and data for the next record (if any)
13. close the file.
14. terminate the script.

Figure 9:
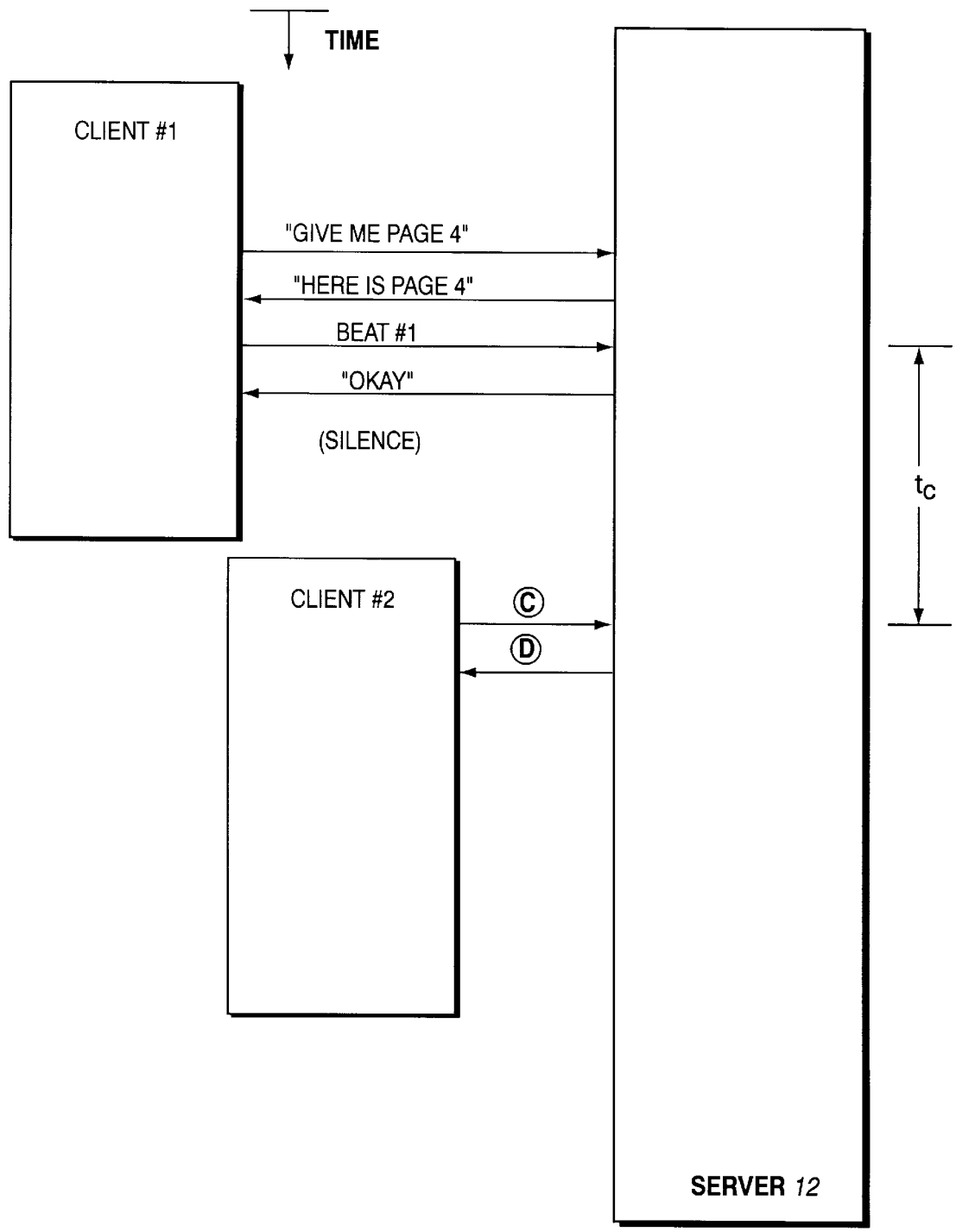
FIG. 9 is a schematic time diagram illustrating communication sessions between a server and two different clients in accordance with an example embodiment of the present invention.

Using the above example scripts, in the embodiment of FIG. 9, examples of the responses from server 12 to clients 1 and 2 are described where each of the clients wishes to receive the same information from server 12. In this example, assuming that client no. 1 has requested payroll information such that the whoAmI file contains "payroll/mike smith." The "remote addr" variable (which contains the IP address of the requesting computer) presently contains the IP address for client no. 1. When client no. 1 makes the request for the page, five possible response conditions can exist.

Possibility no. 1. The server 12 finds that the file "payroll/mike smith" exists and it contains the IP address for client no. 1 and the DTI stamp time is approximately 1 minute ago. This is the normal case and indicates to the server 12 that client no. 1 continues to use the file "payroll/mike smith" and that the beat function is reasserting client no. 1's control over the page.

Possibility no. 2. If server 12, after receiving the requests for the page from client no. 1, finds that the file "payroll/mike smith" exists and contains the IP address for client no. 1, but the DTI stamp for this file is approximately 1 hour ago, the server 12 recognizes this as an unusual condition. In this case, the client no. 1 was viewing the page then left (hence the lack of a more proximate DTI stamp time) and has now returned to the page. The page has been recovered from cache (which should not ordinarily happen, since each page should expire before this condition can occur).

Having recovered the file from cache, client no. 1, which was the former owner of the page, can now reassert control of the page.

Possibility no. 3. If the server finds that the file "payroll/mike smith" does not exists, an error condition has occurred. There is no way that the file cannot exist, since the CGI that delivered the page created the file. However, the script can easily recover from this error if an assumption is made. If the file was deleted somehow, it gets re-created, and client no. 1 becomes the owner of the page. If another client owned the page, it would be re-assigned such that the other owner losses control of the page. Note that this is an unusual case that requires the file to be both lost somehow and hijacked by another owner within the beat time period, which would not likely happen. Nevertheless, the above re-creation and reassignment can take care of this error condition.

Possibility no. 4. If, in response to the page request from client no. 1, server 12 finds that the file "payroll/mike smith" exists and contains the IP address for client no. 2, and the DTI stamp time is approximately 1 minute ago, server 12 will inform client no. 1 that it is no longer the owner of the page and must wait until client no. 2 finishes with it before it can have access. This possibility occurs when client no. 1 accesses the page, finishes with the page, and then attempts to recover the page from cache, while in the interim client no. 2 has taken the page. Since client no. 1's beat terminated, client no. 2 was given access to the page and now client no. 1 cannot recover it from cache until client no. 2 has finished.

Possibility no. 5. The final possibility occurs when the server 12 recognizes that the file "payroll/mike smith" exists, and it contains the IP address for client no. 2, and the time is approximately 1 hour ago. This case is also unusual since the page has come from cache and should have expired before the hour long interval. It is most likely that client no. 2 has given up the page such that client no. 1 can now reassert rights to it. There is one problem that must be addressed though. Client no. 1 may have old data on its page and client no. 1 may end up overwriting client no. 2's newer data. This is the primary reason that pages should not be cached. For true pessimistic locking, the server 12 should caution user no. 1 that it may be using old data and that the work should be re-done with fresh data.

In this manner, the data in the database can be locked when a client is using the data over the Web. The CGI DBUPDATE script on the server 12 is employed to write the data to the database only if it comes from a client who has locked the page. The CGI script will then deliver the next record to the same client. The script also handles cases where a client submitting a page is not the same client who has locked it, however, in the ideal world, this should not happen. If pages are not cached, and only locked pages are delivered by server 12, a second client cannot overlap a first client in retrieving the locked page. However, the script example employed above, in the interest of robustness, covers each of the five possibilities (assuming caching can occur) such that the server 12 will not hang up.

Having studied the above descriptions, one can see that the present invention provides session control to HTTP communications, even though the Web protocols define sessions as solely one page request and one page response. With the present invention, a server can determine how long a client is viewing a page and can lock clients out of pages containing database information when other clients are already accessing the same database entries.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An Internet server connected to provide access for clients on the Web, comprising:
   a memory for storing Web page information; and
   a page compiler for receiving a Web page request from a requesting client, creating a Web page in response to the request using certain of the Web page information; attaching a page script function to the Web page, and transmitting the Web page with the page script function over the Internet to the requesting client, wherein:
      the script function creates at least one message to be sent to the network server from the requesting client; and
      the server responds to other clients thereafter requesting the Web page information by modifying access to at least some of the Web page information for as long as the at least one message created by the script function at the requesting client is received by the server.

2. The Internet Server according to claim 1, wherein the script function creates the at least one message only as long as the requesting client is using the requested Web page.

3. The Internet Server according to claim 1, wherein the script function creates the at least one message only as long as the requesting client is continuously using the requested Web page.

4. The Internet Server according to claim 1, wherein the page compiler further includes a script process for generating a reply message sent from the server to the requesting client, and wherein the at least one message created by the page script function at the requesting client includes requests for the server to run the script process and thereby generate and send the reply message each time the server receives the at least one message.

5. The Internet Server according to claim 4, wherein the reply message is an empty message.

6. The Internet Server according to claim 1, further including an access log for recording all received messages created by the page script function at the requesting client.

7. The Internet Server according to claim 6, wherein the access log maintains a record of when all said message created by the page script function are received, and the server further includes a processor to analyze the access log to determine based on the record whether a requesting client is continuing to use a requested Web page.

8. The Internet Server according to claim 1, wherein the memory includes a database.

9. The Internet Server according to claim 8, wherein the Web page information includes data points that can be retrieved and altered in the database by the requesting client.

10. The Internet Server according to claim 9, wherein the database includes date and time fields for said data points, each said date and time field including information identifying which requesting client last accessed a corresponding data point and when said last access occurred.

11. The Internet Server according to claim 9, wherein the database includes date and time fields for said data points, each date and time field including information identifying at least one requesting client that accessed a corresponding data point most recently and when said last accesses by said at least one requesting client occurred.

12. The Internet Server according to claim 1, wherein the script function creates more than one message and does so at a pre-assigned beat.

13. The Internet Server according to claim 12, wherein the pre-assigned beat is linear.

14. The Internet Server according to claim 1, wherein the pre-assigned beat exhibits an irregular repetition.

15. The method according to claim 1, wherein the page script function creates the at least one message at at least one corresponding specified time.

16. A method of creating a Web page for transmission on the Internet, comprising:
   receiving a Web page request from a requesting client;
   retrieving Web page information to build the requested Web page;
   compiling the Web page information into the requested Web page;
   attaching a page script function to the requested Web page, the page script function causing at least one message to be sent from the requesting client;
   transmitting the Web page with the page script function over the Internet to the requesting client; and
   thereafter responding from the server to other clients requesting the Web page by modifying access to at least some of the Web page information for as long as the at least one message created by the page script function at the requesting client is received by the server.

17. The method according to claim 16, wherein the step of retrieving includes the step of accessing a database for at least some of the Web page information.

18. The method according to claim 16 further including the steps of:
   sending more than one message and doing so according to a pre-assigned beat frequency; and
   locking other requesting clients out of the requested page until the page script function no longer sends the additional Web page requests at the pre-assigned beat frequency.

19. The method according to claim 16, wherein the page script function creates the at least one message at at least one corresponding specified time.

20. A network server connected to provide access for clients on a network, the clients accessing the network server in accordance with a session protocol defining a session as one session request and one session response, the network server comprising;
   a memory for storing page information; and
   a page compiler for receiving a page request from a requesting client, creating a page in response to the request using certain of the stored page information; attaching a page script function to the created page, and transmitting the created page with the page script function over the network to the requesting client, wherein:
      the script function creates at least one message to be sent to the network server from the requesting client; and
      the server responds to other clients requesting the stored page information by modifying access to at least some of the stored page information for as long as the at least one message created by the page script function at the requesting client is received by the server.

21. The network according to claim 20, wherein the script function creates the at least one message only as long as the requesting client is using the created page.

22. The network server according to claim 20, wherein the script function creates the at least one message only as long as the requesting client is continuously using the created page.

23. The network server according to claim 20, wherein the page compiler further includes a script process for generating a reply message sent from the network server to the requesting client, and wherein the at least one message created by the page script function includes requests for the network server to run the script process and thereby generate and send the reply message each time the network server receives the at least one message created by the page script function.

24. The network server according to claim 23, wherein the reply message is an empty message.

25. The network server according to claim 20, further including an access log for recording all messages created by the page script function.

26. The network server according to claim 25, wherein the access log maintains a record of when all messages are received, and the network server further includes a processor to analyze the access log to determine based on the record whether a requesting client is continuing to use a requested page.

27. The network server according to claim 16, wherein the page information includes page files.

28. The network server according to claim 20, wherein the memory includes a database.

29. The network server according to claim 16, wherein the page information includes data points that can be retrieved and altered in the database by the requesting client.

30. The network server according to claim 29, wherein the database includes date and time fields for said data points, each said date and time field including information identifying which requesting client last accessed a corresponding data point and when said last access occurred.

31. The network server according to claim 29, wherein the database includes date and time fields for said data points, each date and time field including information identifying at least one requesting client that accessed a corresponding data point most recently and when said last accesses by said at least one requesting client occurred.

32. The network server according to claim 20, wherein the script function creates more than one message and does so at a pre-assigned beat.

33. The network server according to claim 32, wherein the pre-assigned beat is linear.

34. The network server according to claim 20, wherein the pre-assigned beat exhibits an irregular repetition.

35. The method according to claim 20, wherein the page script function creates the at least one message at at least one corresponding specified time.

36. A method of creating a page for transmission on a network of clients and servers employing session protocols defining each session as one session request and one session response, comprising:

receiving a page request from a requesting client;

retrieving page information to build a requested page;

compiling the page information into the requested page;

attaching a page script function to the requested page, the page script function causing at least one message to be sent from the requesting client;

transmitting the page with the page script function over the network to the requesting client; and thereafter responding from the servers to other clients requesting the requested page by modifying access to at least some of the page information for as long as the at least one message created by the page script function at the requesting client is received by the server.

37. The method according to claim 36, wherein the step of retrieving includes the step of accessing a database for at least some of the page information.

38. The method according to claim 36 further including the steps of:

sending more than one message and doing so according to a pre-assigned beat; and locking other requesting clients out of the requested page until the page script function no longer sends the additional page requests at the pre-assigned beat.

39. The method according to claim 36, wherein the page script function creates the at least one message at at least one corresponding specified time.

* * * * *